United States Patent [19]

Imafuji et al.

[11] Patent Number: 5,724,616
[45] Date of Patent: Mar. 3, 1998

[54] LENS DRIVING SYSTEM FOR CAMERA WITH ANTI-VIBRATION FUNCTION

[75] Inventors: Kazuharu Imafuji, Kawasaki; Nobuhiko Terui, Ichikawa; Sueyuki Ohishi, Tokyo; Tatsuo Amanuma, Ageo, all of Japan

[73] Assignee: Nikon Corporation, Tokyo, Japan

[21] Appl. No.: 377,330

[22] Filed: Jan. 24, 1995

[30] Foreign Application Priority Data

Feb. 4, 1994 [JP] Japan ................... 6-012826
Mar. 17, 1994 [JP] Japan ................... 6-047252

[51] Int. Cl.⁶ .................. G03B 5/02; H04N 5/228
[52] U.S. Cl. ........................... 396/55; 348/208
[58] Field of Search ........................ 354/400, 410, 354/430, 70, 202, 195.12; 348/208; 396/55

[56] References Cited

U.S. PATENT DOCUMENTS 3,500,050  3/1970  Hillman .
5,130,729  7/1992  Sato et al. ................ 354/202
5,389,997  2/1995  Ohishi ..................... 354/430
5,416,558  5/1995  Katayama et al. .......... 354/446

Primary Examiner—Michael L. Gellner
Assistant Examiner—Daniel Chapik

[57] ABSTRACT

A lens driving system for a camera with an anti-vibration function has a vibration correcting lens drivable in a direction in which blurring of an image on an image surface due to a camera shake is prevented from occurring, vibration correcting lens driving means for driving the vibration correcting lens, a photointerrupter detecting a relative position and speed of the vibration correcting lens, and a disk being connected to the correcting lens driving means and having a plurality of slits determined in accordance with the width of a slit of a light receiving section of the photointerrupter and the resolution of detection of shift of the vibration correcting lens in order to turn on and off the photointerrupter repeatedly.

15 Claims, 14 Drawing Sheets

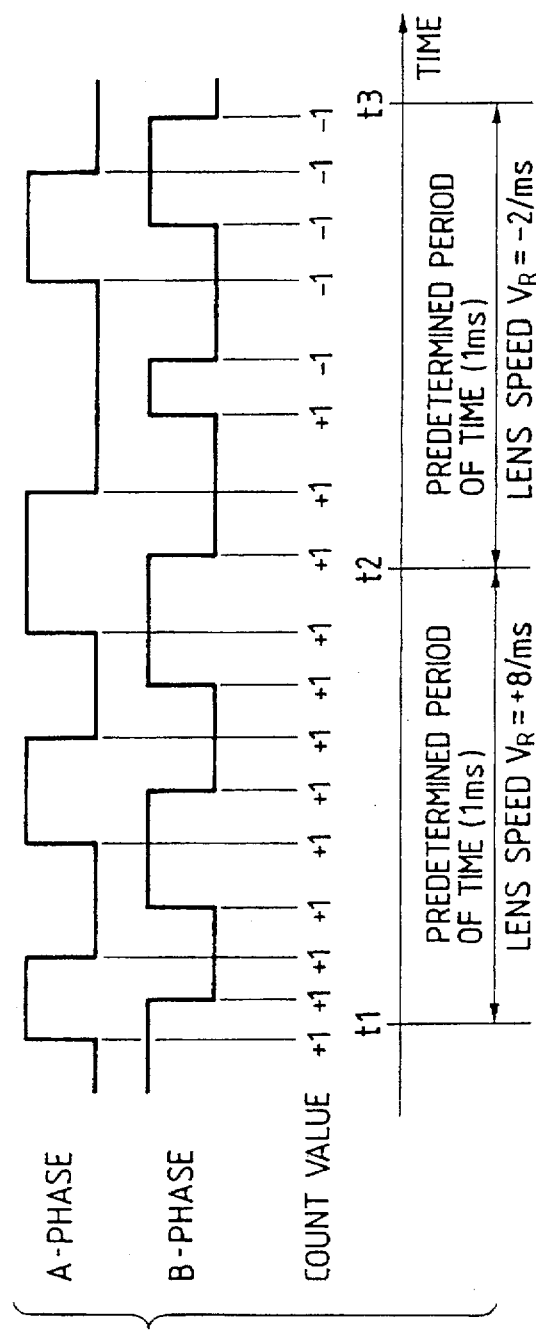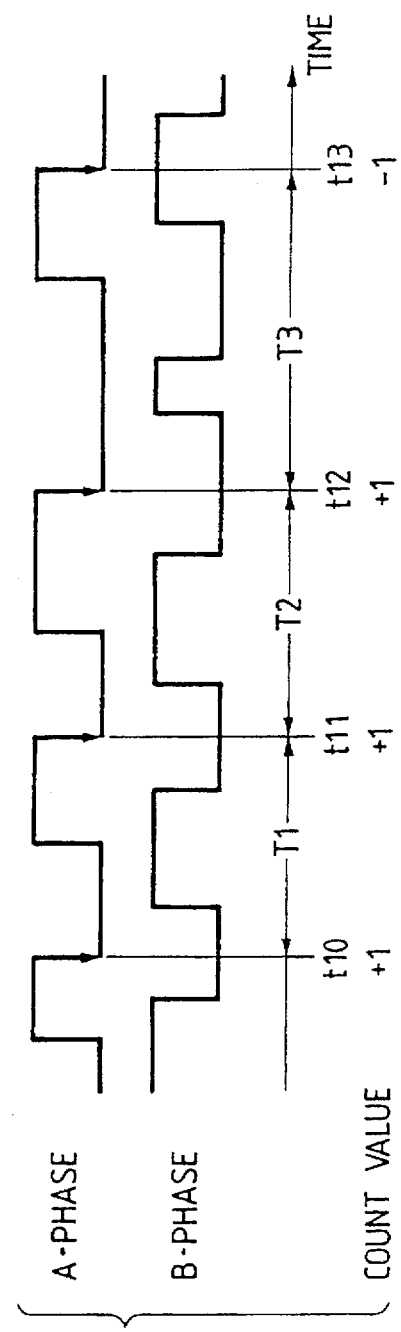
FIG. 16
FIG. 17 (PRIOR ART)

LENS DRIVING SYSTEM FOR CAMERA WITH ANTI-VIBRATION FUNCTION

BACKGROUND OF THE INVENTION

1. Field of the Invention

The present invention relates to a lens driving system of a vibration correcting device for detecting blurring of an image to be produced on an image surface due to vibration of a camera and preventing the blurring of the image from occurring.

2. Related Background Art

Recent cameras have various electronic functions such as an automatic exposure function and an autofocus function, and are highly automated. However, there has been insufficient attempts to automate cameras with measures against blurring of an image due to a camera shake occurring when taking a photograph in a state with the camera held by hands.

Therefore, in such cameras, a vibration correcting device is used to correct a shake and vibration of the camera, and in particular, blurring of an image occurring when the camera is inclined. The vibration correcting device has vibration detecting means such as an angular speed sensor and an acceleration sensor formed of a piezoelectric element. The angular speed sensor detects the shake and vibration of the camera by detecting a force received when the camera rotates, i.e., "Coliolis force". In accordance with the result of the detection, a vibration correcting optical system is shifted in a direction for absorbing the shake and vibration of the camera within a plane perpendicular to the optical axis of the principal optical system thereby to correct the blurring of the image.

That is, in the cameras with the anti-vibration function having the above-mentioned vibration correcting device, the angular speed or the acceleration of the vibration of the camera due to the camera shake is detected by the vibration detecting means. Then, in accordance with the result of the detection, calculating means such as a microcomputer calculates a proper amount of correction for the blurring of the image to be produced on the image surface due to the camera shake. Based on the result of the calculation, the vibration correcting lens system provided in a lens barrel is shifted by a drive mechanism vertically or laterally to correct a phototaking optical path to make the image stationary on the image surface.

In the vibration correcting device, an electric motor is generally utilized as an actuator for driving the vibration correcting lens system or a variable vertex angle prism.

In order to detect the amount of drive and the drive speed of the vibration correcting lens, a rotating disk provided with a number of slits is mounted to a driving system such as the electric motor and the rotation of the disk is detected by a photointerrupter.

In the driving system of the vibration correcting lens of such a camera with the anti-vibration function, when correcting a camera shake, high resolution in detecting the amount of drive of the vibration correcting lens is required to reduce an error in correcting the camera shake. When the rotation of the motor is decelerated by means of gears, high resolution can be obtained, but the maximum drive speed of the vibration correcting lens is lowered. As a result, the drive speed of the vibration correcting lens cannot follow the speed of blurring of an image to be formed on the image surface due to the camera shake. Also, as the number of gears increases, an amount of backlash increases. Therefore, even though the resolution in detecting the amount of drive of the vibration correcting lens is enhanced, the error in correcting the camera shake increases.

Also, if the number of slits of the rotating disk mounted to the motor driving system is increased, the resolution can be enhanced. However, the width of the slits is narrowed, so that fluctuations in duty of output pulses of the photointerrupter are enlarged. When two photointerrupters are utilized for one rotating disk to detect the rotation direction of the rotating disk, phases of two outputs of the photointerrupters might be reversed due to the fluctuations in duty, causing an error in detecting the drive direction.

Also, when the two photointerrupters are utilized for one rotating disk, current supplied to LEDs on the sides of light receiving sections of the photointerrupters is increased, so that a battery is spent quickly.

FIG. 15 is a block diagram showing an example of a conventional camera with an anti-vibration function. In order to actually correct a camera shake, angular speeds of the camera shake in at least two directions with respect to the camera need to be detected, and the optical axis of the camera need to be changed in the respective directions of the detected angular speeds. However, these operations are controlled by the same method, so the method of correcting the camera shake in one direction will be described.

In the camera, a vibration correcting lens 118 (hereinafter simply referred to as the correcting lens) constituting a portion of phototaking lens 116, 117, 118, 119 is shifted to cancel the camera shake in accordance with a detected vibration detection signal (the angular speed).

An angular speed detecting circuit 115 detects the angular speed due to the camera shake, and an angular speed sensor can be utilized for the angular speed detecting circuit 115. In accordance with the change in angular speed, the output value of the angular speed detecting circuit 115 changes, so the angular speed detecting circuit 115 can detect the angular speed due to the camera shake momentarily. The output of the angular speed detecting circuit 115 is sent to a one chip microcomputer (CPU) 100.

The CPU 100 contains a ROM for storing programs for carrying out the process of the CPU 100, and a RAM for storing data temporarily. Also, in addition to those, the CPU 100 has an A/D converter 101, an interval timer 103, an edge interval measuring timer 105, a lens speed and position calculating section 107 for calculating the position, speed and shifting direction of the correcting lens 118, and a motor control processing section 109 for calculating a target speed (an absolute value and a direction) and a position of the correcting lens 118 from an A/D converted value from the A/D converter 101 and controlling a motor 114 in accordance with the target speed of the correcting lens 118 and the actual speed of the correcting lens 118.

The A/D converter 101 performs the A/D conversions of the output of the angular speed detecting circuit 115 at predetermined time intervals. The output is supplied to the motor control processing section 109. The motor control processing section 109 determines at what speed the correcting lens 118 is to be shifted in order to limit the camera shake, i.e., calculates the target speed of the correcting lens 118. The output is supplied to a motor drive circuit 112.

The motor drive circuit 112 controls the number of rotations of the motor 114 in accordance with the calculated target speed of the correcting lens 118. The rotation of the motor 114 is decelerated by gears. The rotational motion of the gears is transformed into linear motion which is transmitted to the correcting lens 118 to shift the correcting lens 118.

A position detecting interrupter 113 detects the position of the correcting lens 118. The output signal from the position detecting interrupter 113 is sent to the lens speed and position calculating section 107 in the CPU 100. The lens speed and position calculating section 107 calculates the position, speed and shifting direction of the correcting lens 118. The output is sent to the motor control processing section 109. The motor control processing section 109 controls the speed of the correcting lens 118 by providing negative feedback on the number of rotations of the motor 114 based on the output of the lens speed and position calculating section 107.

The operation procedure of the conventional camera is as follows.

First, the correcting lens 118 is shifted approximately to the center position of its shifting range (centering operation) so as to position the phototaking optical axis in a predetermined center position. Thereafter, a shutter is operated and immediately before an exposure process for exposing a photographic film, the correcting lens 118 is controlled so as to cancel a camera shake in accordance with an output from the angular speed detecting circuit 115 (hereinafter referred to as anti-vibration control). The anti-vibration control is terminated upon the completion of the exposure process. Thereafter, the vibration correcting lens is driven (reset operation) to a predetermined reference position (reset position).

Next, focusing on the operation of the CPU 100, the operation procedure of the vibration correcting lens will be described. First, the detection of the angular speed due to the camera shake will be described.

When the angular speed detecting circuit 115 detects the angular speed due to the camera shake, it outputs an angular speed signal to the A/D converter 101 in the CPU 1. The A/D converter 100 performs the A/D conversions of the angular speed signal by interruption operations produced from the interval timer 103 at predetermined time intervals (e.g., time intervals of about 1 ms). The A/D converted signal is output to the motor control processing section 109.

The motor control processing section 109 continues calculating the target speed VC of the correcting lens 118 from the A/D converted value in accordance with the following equation:

$$VC = K0 \times (A/D \text{ converted value}). \quad (1)$$

The coefficient K0 determines what speed the correcting lens 118 is to be shifted with respect to the A/D converted value in order to correct the camera shake appropriately. The value is determined by characteristics of the phototaking optical system (116, 117, 118, 119), the angular speed detecting circuit 5 and the A/D converter 101 and the like. It is assumed that the same unit is utilized for the target speed VC and the actual speed VR of the correcting lens 118.

Next, the method of detecting the position, speed and shifting direction of the correcting lens 118 will be described by utilizing a transmission-type encoder.

The position detecting interrupter 113 is constructed by mounting a rotating disk with a plurality of slits to one of gears for transforming rotation of the motor 114 into linear motion, and positioning a pair of interrupters with respect to the disk so as to make the phase difference between outputs of the interrupters be about 90°. Each interrupter detects the slits of the disk.

FIG. 17 is a timing chart for showing a conventional method of calculating the position and speed of the correcting lens. A- and B-phases in FIG. 17 are outputs of the pair of interrupters, and have a phase difference of 90° owing to rotation of the motor 114.

The absolute value of the speed of the correcting lens 118 can be detected by a cycle of the output of the A-phase or the B-phase.

The shifting direction of the correcting lens 118 can be obtained by judging whether at a rising edge or a falling edge of the output of one of the A- and B-phases, the output of the other is on the high level or low level.

The position LR of the correcting lens 118 can be detected at rising or falling edges of the output of one of the A- and B-phases by counting up or down level states of the output of the other.

The position LR of the correcting lens 118 is utilized in a centering operation for driving the correcting lens 118 to the center position of its shifting range or a reset operation for driving the correcting lens 118 to the reset position.

The detection of the speed, shifting direction and position of the correcting lens 118 is performed by the lens speed and position calculating section 107 in the CPU 100 based on the outputs of the A- and B-phases of the position detecting interrupter 113.

Next, an example of a method of detecting the position, speed and shifting direction of the correcting lens 118 will be described with reference to FIG. 17.

First, at the time t10, the falling of the A-phase is detected and the phase of the B-phase is read simultaneously. In FIG. 17, the B-phase is on the low level, so 1 is added to the value of the position LR of the correcting lens. Next, at the time t11, the falling of the A-phase is detected and the phase of the B-phase is read simultaneously. In FIG. 17, the B-phase is on the low level, so 1 is added to the value of the correcting lens position LR, also. This process is repeated and the correcting lens position LR is detected in real time.

Also, the correcting lens speed VR is obtained by calculating the absolute value of the correcting lens speed VR and judging the sign of the correcting lens speed VR. The absolute value of the correcting lens speed VR is calculated by measuring the time T1 between the falling of the A-phase at the time t10 and the following falling thereof at the time t11 by means of the edge interval measuring timer 105 and obtaining the inverse number of the time T1. The sign of the correcting lens speed VR is plus when the phase of the B-phase at the time t11 is on the low level, and minus when it is on the high level. This can be expressed by the following equations (2), (3). The same operation is repeated after the time t12, whereby the correcting lens speed VR is detected in real time.

$$VR = a \times \{(1/\text{the time of a cycle of the A-phase})\} \quad (2)$$

$$a = +1; \text{ the B-phase is low at the falling of the A-phase, } -1; \text{ the B-phase is high at the falling of the A-phase.} \quad (3)$$

Next, a method of controlling the motor 114 will be described with reference to FIG. 19.

As shown in FIG. 19, the motor control processing section 109 calculates the target speed VC of the correcting lens 118 based on the output of the angular speed detecting circuit 115 and controls the motor 114 in accordance with the target speed VC and the actual correcting lens speed VR at that time as follows:

When $VC \geq 0$;

When $VR < VC$, the motor 114 is energized in a forward direction.

When $VR \geq VC$, the motor 114 is idled or switched into a shortly braked state.

When $VC < 0$;

When VR>VC, the motor 114 is energized in a reverse direction.

When VR≦VC, the motor 114 is idled or switched into a shortly braked state.

First, when VC is zero or positive and VR<VC, i.e., when the actual speed is less than the target speed, the motor control processing section 109 energizes the motor 114 in the forward direction via the motor drive circuit 112. On the other hand, when VR≧VC, i.e., when the actual speed is larger than or equal to the target speed, the motor control processing section 109 idles the motor 114 or makes it in the shortly braked state via the motor drive circuit 112.

Also, when VC is negative and VR>VC, the motor control processing section 109 energized the motor 114 in the reverse direction via the motor drive circuit 112. On the other hand, when VR≦VC, the motor control processing section 109 idles the motor 114 or makes it in the shortly braked state.

Now, the control of the motor control processing section 109 when VC is positive will be described with reference to FIG. 19. Between the time ti and the time tj, VR<VC, so that the motor 114 is energized in the forward direction. Between the time tj and the time tl, VR≧VC, so that the motor 114 is idled or made into the shortly braked state. The motor control processing section 109 performs the same operation after the time tl.

However, in the above-mentioned conventional camera, the following problems arise.

First, in order to calculate the correcting lens position LR and the correcting lens speed VR, the risings or the fallings of the A-phase or the B-phase need to be detected in real time. Also, during correcting the camera shake, the CPU needs to perform other processes such as control of the shutter. Therefore, the CPU 100 detects VR and LR by driving an interrupting process upon the rising or the falling of the A-phase or the B-phase.

However, when the CPU 100 calculates the inverse number of the cycle of the A- or B-phases to obtain VR as expressed in the equation (2), it takes a considerable time to calculate it while achieving high calculation accuracy. This calculation might cause fairly heavy load on the one chip microcomputer used for the ordinary camera.

Also, in order to correct the camera shake accurately, in the centering and the reset operations, stopped positions of the correcting lens 8 need to be controlled with high accuracy. For that purpose, it is essential to improve the detection accuracy of the correcting lens speed VR and the correcting lens position LR and to improve the real-time detecting operation thereof.

However, after the first rising or falling of the interrupter signal, when the following rising or falling thereof is detected, the correcting lens speed VR is first detected. Therefore, during that period of time, the correcting lens speed VR cannot be detected. Therefore, when the correcting lens 118 shifts at a slow speed, a time interval for calculating the correcting lens speed VR becomes very long.

In order to solve this problem, it is preferable to calculate the correcting lens speed VR both at risings and fallings of the A-phase or both at risings and fallings of the B-phase. However, in this case, the process of the CPU 100 is increased.

Also, the same can be said for the correcting lens position LR. In the above description, a falling of the A-phase is a unit of the count, and if the counting operation is also carried out at the risings of the A-phase and at the risings or fallings of the B-phase, the resolution in detecting the correcting lens position LR could be enhanced. However, in this case, the process of the CPU 100 is increased, too.

As a second problem, in this conventional motor control method, the motor 114 is controlled by energizing it or not energizing it, so the correcting lens 118 cannot be shifted smoothly. Further, when controlling the motor 114 at a slow speed, the motor 114 is energized or idled or switched into a shortly braked state repeatedly. Therefore, the correcting lens 118 is operated rattlingly and awkwardly.

It is an object of the present invention to solve the above-mentioned problems by providing a camera with an anti-vibration function wherein the process is to be reduced for calculating the position, the speed and the like of the correcting lens which functions as an optical axis changing section and wherein it is possible to drive and control the correcting lens accurately.

SUMMARY OF THE INVENTION

It is an object of the present invention to provide a lens system of a camera with an anti-vibration function in which resolution in detecting the position of a correcting lens is enhanced to reduce an error in correcting blurring of an image due to a camera shake.

For achieving the above object, in the present invention, the shape and width of slits of a disk for a photointerrupter and current supplied to an LED of a light receiving section of the photointerrupter are set such that even though the number of slits of the disk is increased thereby to cause the width of the slits to be narrowed, fluctuations in duty of output pulses of the photointerrupter are reduced and the duty becomes approximately 50%.

Therefore, resolution in detecting the position of a correcting lens can be enhanced. Also, as fluctuations of duty of the output pulses of the photointerrupter is small, the two outputs of the photointerrupter can be counted by a double or quadruple multiplication counter.

Also, when two photointerrupters are utilized for a disk, LEDs of light receiving sections of the photointerrupters are connected in series.

Therefore, it is possible to prevent a battery from being spent in vain.

Further, since deceleration due to gears of a motor driving system is small, it is possible to shift the correcting lens at a maximum drive speed.

For achieving the above object, a camera with an anti-vibration having an optical axis changing section for changing a taking optical axis; an optical axis change driving section for driving the optical changing section; and a displacement detecting section for detecting displacement of the optical axis changing section and outputting it as two-phase interrupter signals, the camera comprises: a double or quadruple multiplication counter for increasing or decreasing its count at risings and fallings of at least one of the two-phase interrupter signals of the displacement detecting section based on the phase difference between the two-phase interrupter signals; and a displacement calculating section for directly calculating the displacement based on the count of the multiplication counter.

The camera further comprises; a Pulse Width Modulation (PWM) timer for outputting a signal, the rate of the width of the signal on a high level during a predetermined period of time being changed based on an output from the multiplication counter, the optical axis change driving section being controlled by the output of the PWM timer.

The camera further comprises an interval timer for driving interruption processes at predetermined time intervals, wherein the displacement of the optical axis changing section is detected by the count of the multiplication counter, the speed of the displacement is calculated by the previous count of the multiplication counter and the present count of the multiplication counter based on each of the interruption processes driven by said interval timer, and said optical axis change driving section is controlled by the output of said PWM timer.

In the present invention, by referring to the count of the multiplication counter, it is possible to detect the position of the optical axis changing section such as a correcting lens and to reduce the load of processes such as displacement calculation.

More specifically, the multiplication counter such as a quadrupler counter which increases or decreases its count at risings and fallings of the two-phase interrupter signals based on the phase difference between the two-phase interrupter signals is contained in a one chip microcomputer, and the position of the correcting lens is detected by the count of the multiplication counter.

Also, by setting a desirable value in the PWM timer, it is possible to drive the optical axis change driving section such as a motor.

More specifically, the PWM timer for outputting a signal whose width on the high level during a predetermined period of time is changed based on the input from the multiplication counter is contained in the one chip microcomputer, and the motor and the like is controlled by the output of the PWM timer.

Further, it is possible to calculate the speed of the optical axis changing section such as the correcting lens by obtaining the difference between the previous count of the multiplication counter and the present count of the multiplication counter based on each of the interruption processes driven by the interval timer.

More specifically, an interval timer for driving the interruption processes at predetermined time intervals is contained in the one chip microcomputer. Then, in each of the interruption processes, the speed of the correcting lens is calculated by the use of the previous count of the multiplication counter and the present count of the multiplication counter.

BRIEF DESCRIPTION OF THE DRAWINGS

FIG. 16 is a timing chart showing the operation of the quadrupler counter and a method of calculating the position and speed of the correcting lens in a camera according to the present invention;

FIG. 17 is a timing chart showing a method of calculating the position and speed of the correcting lens in the conventional camera of the prior-art example;

DETAILED DESCRIPTION OF THE PREFERRED EMBODIMENTS

Figure 1:
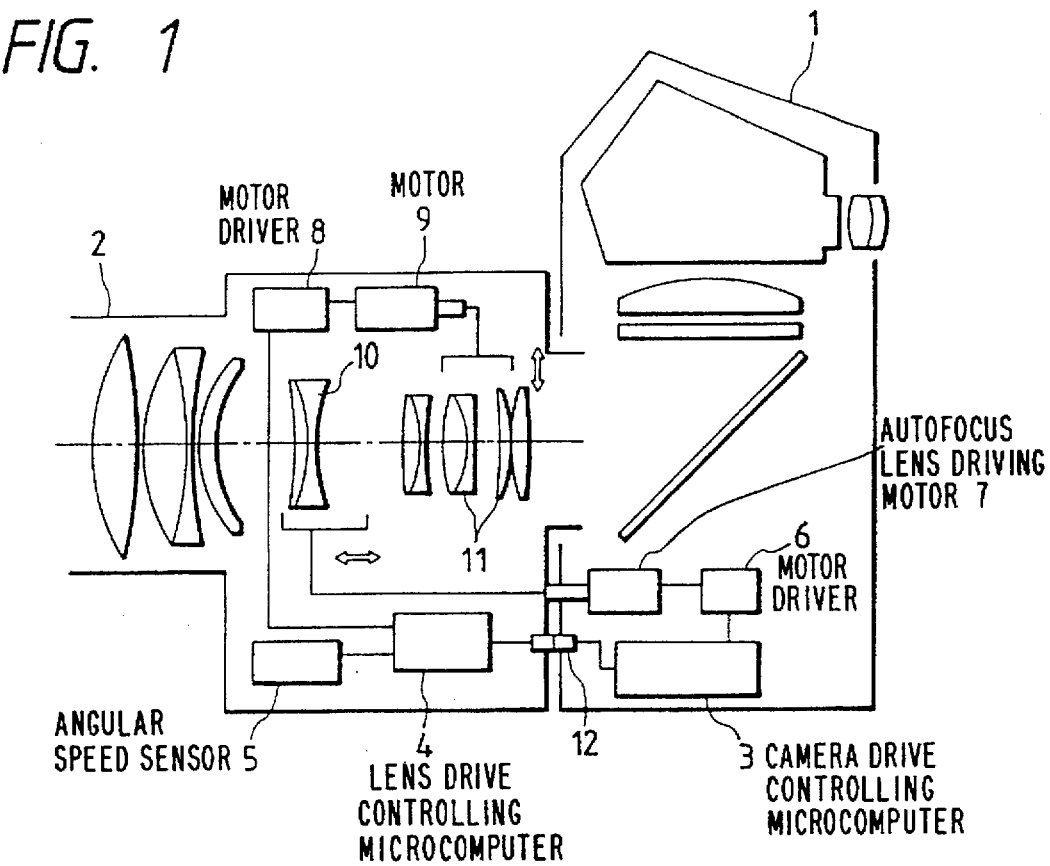
FIG. 1 a vertical sectional view of a camera with an anti-vibration function according to a preferred embodiment of the present invention.

FIG. 1 is a vertical sectional view of a camera with an anti-vibration function according to an embodiment of the present invention.

The camera is constructed of a camera body 1 and a lens barrel 2 mounted removably to the camera body 1.

The camera body 1 has a camera drive controlling microcomputer 3 for controlling a photographing operation of the camera body 1, an autofocus lens driving motor 7 and a motor driver 6 for the autofocus lens driving motor 7. The lens barrel 2 has a lens drive controlling microcomputer 4 for controlling the photographing operation, an angular speed sensor 5 for outputting a voltage proportional to the angular speed of a camera shake, a vibration correcting lens 11 drivable in the vertical and lateral directions to correct blurring of an image to be formed on an image surface due to the camera shake, a focus detecting lens 10 drivable in the optical axis direction to detect a focal point, a motor 9 for driving the vibration correcting lens 11 in the vertical direction, and a motor driver 8 for the motor 9. The microcomputer 3 sends signals to the microcomputer 4 and receives signals therefrom.

Figure 2:
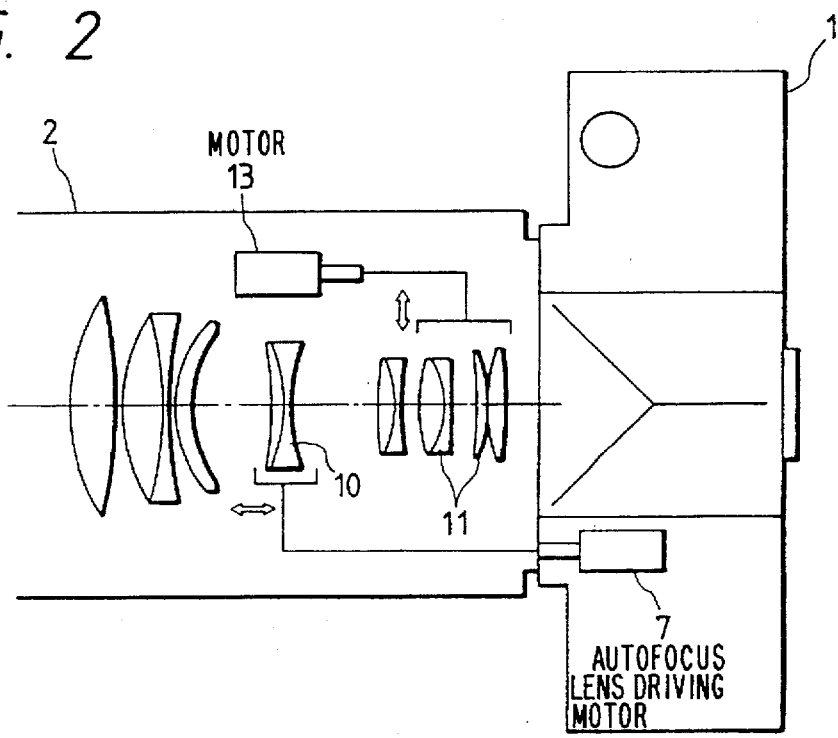
FIG. 2 is a horizontal sectional view of the camera of FIG. 1.

FIG. 2 is a horizontal sectional view of the camera of FIG. 1.

In FIG. 2, a motor 13 for driving the vibration correcting lens 11 in the lateral direction is shown.

Figure 3:
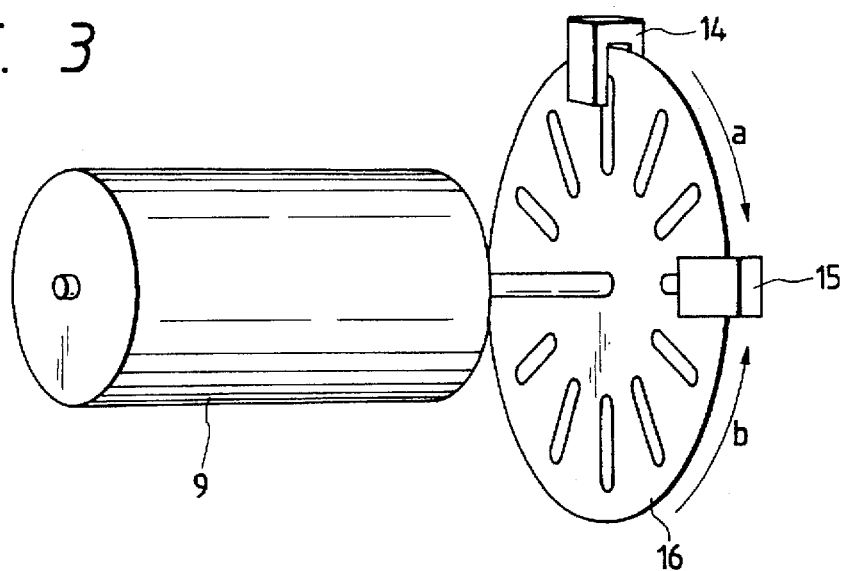
FIG. 3 is an explanatory diagram showing the motor section of the camera of FIG. 1.

FIG. 3 is a diagram showing a motor portion of the motors 9, 13 which are used in the embodiment as shown in FIGS. 1 and 2. The motor 9 is shown in this figure.

A rotating disk 16 is mounted to the shaft of the motor 9. The rotating disk 16 has a plurality of slits elongated in the radial direction. Photointerrupters 14, 15 are disposed at peripheral portions of the disk 16. The photointerrupters 14, 15 have the same structure.

When the disk 16 is rotated by the motor 9, optical continuity and cutoff of the photointerrupters 14, 15 are repeated, and pulses whose number corresponds to the amount of shift of the correcting lens 11 are generated from each of the photointerrupters 14, 15. The rotation speed of the motor 9 can be detected by detecting the pulses and measuring the detection time of the pulses. Also, the rotation direction of the motor 9 can be detected by the use of the two interrupters 14, 15. In FIG. 3, the disk 16 is mounted directly to the shaft of the motor 9, but may be mounted to any portion within a gear train of the motor 9.

Figure 4A:
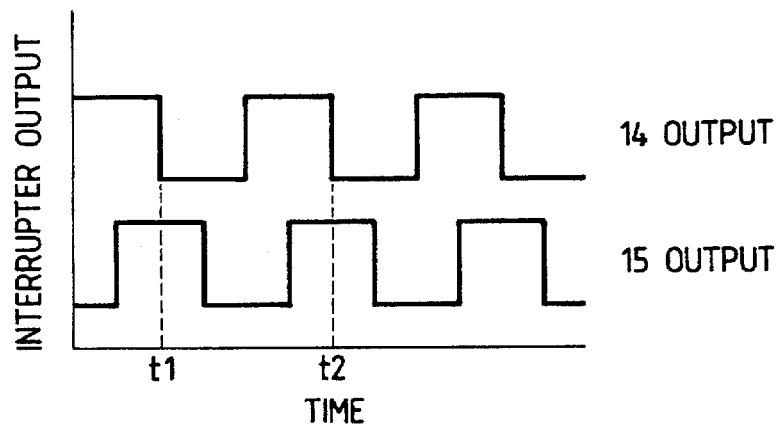
FIGS. 4A and 4B are timing charts showing the outputs of the photointerrupters 14, 15 in the camera of FIG. 3.
Figure 4B:
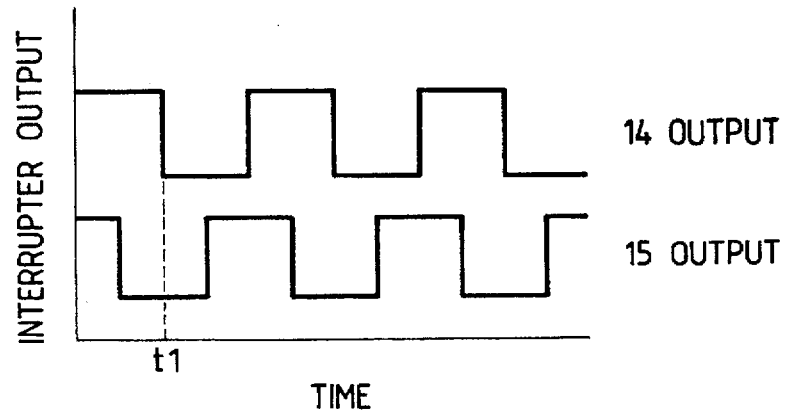

FIGS. 4A and 4B are timing charts showing the outputs of the photointerrupters 14, 15 in FIG. 3.

FIG. 4A shows the outputs of the photointerrupters 14, 15 when the disk 16 is rotated at a constant speed in an a direction. FIG. 4B shows the outputs of the photointerrupters 14, 15 when the disk 16 is rotated at a constant speed in a b direction. The photointerrupters 14, 15 are disposed such that the phase difference between the outputs of the photointerrupters 14, 15 becomes 90°, as shown in FIGS. 4A and 4B.

In FIG. 4A, at the falling edge time t1 of the output of the photointerrupter 14, the output of the photointerrupter 15 is on the high level. In FIG. 4B, at the time t1, the output of the photointerrupter 15 is on the low level. Thus, when at a pulse edge of one photointerrupter, the output level of the other photointerrupter is detected, the rotation direction of the disk 16 can be detected.

Also, it is possible to detect the rotation speed of the disk 16 by measuring the falling edge time t1 and t2 of the output of the photointerrupter 14 in FIG. 4A.

Figure 5:
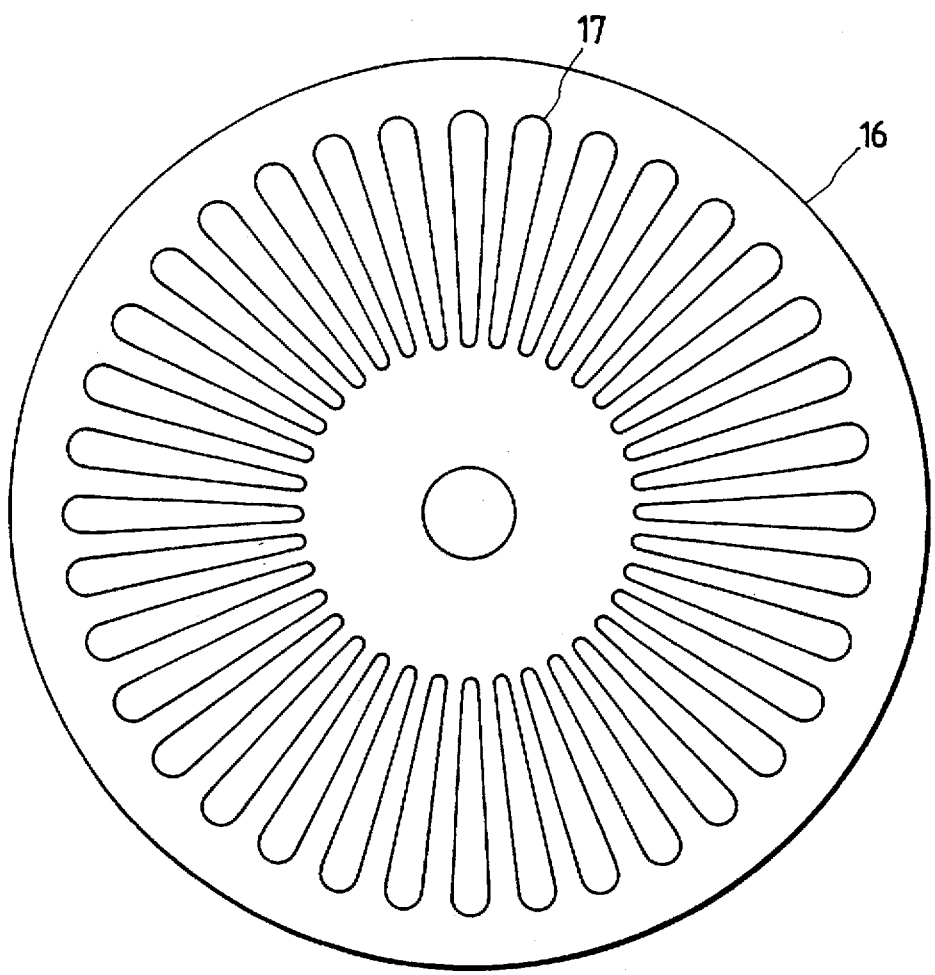
FIG. 5 shows the disk in the camera of FIG. 3.

FIG. 5 shows the disk 16 to be rotated by the motor in FIG. 3.

The disk 16 is provided with a plurality of slits 17 formed in the radial direction. The rotation of the disk 16 causes transmission and cutoff of light to be repeated.

Figure 6A:
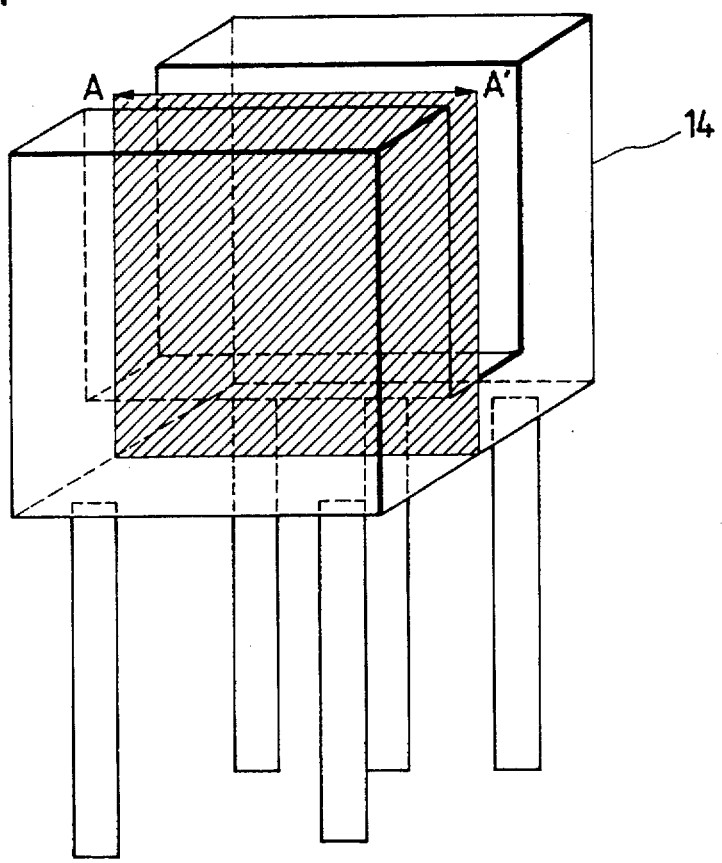
FIG. 6A is an enlarged view of the photointerrupter 14 of FIG. 3.

FIG. 6A is an enlarged view of the photointerrupter 14 in FIG. 3.

The photointerrupter 14 is formed with a groove and has a light emitting section such as an LED on one side of the groove, and a light receiving section such as a phototransistor on the other side thereof. When the slits 17 of the disk 16 pass through the groove, on state and off state are repeated.

Figure 6B:
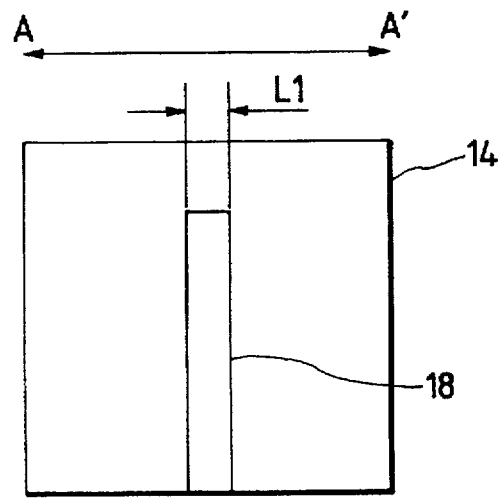
FIG. 6B is a diagram showing the light receiving section side of a cross section obtained by cutting the hatched portion in FIG. 6A in the A-A' direction.

FIG. 6B is a diagram showing the light receiving section side of a cross section obtained by cutting the hatched portion in FIG. 6A in the A–A' direction.

The light receiving section has a light receiving slit 18 having a width L1. When light from the light emitting section such as an LED is incident on the slit 18, the light receiving section becomes the on state.

Figure 7A:
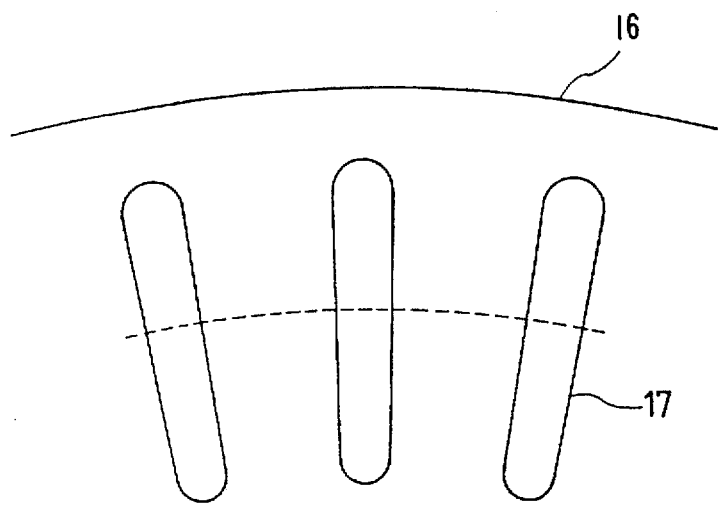
FIG. 7A is an enlarged view of a portion of the disk 16 of FIG. 5.

FIG. 7A is an enlarged view showing a portion of the disk 16.

The disk 16 has the slits 17 provided in the radial direction. A broken line in FIG. 7A indicates the position where the optical axis of the light emitting and light receiving sections of the photointerrupter passes.

Figure 7B:
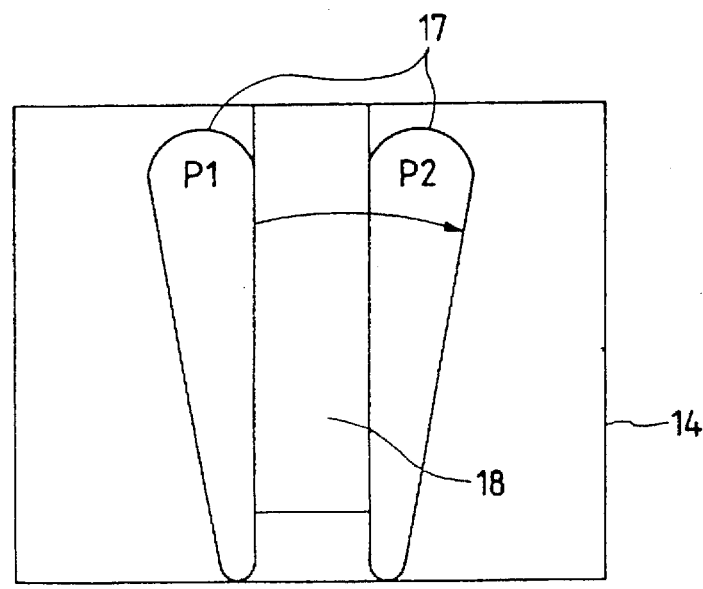
FIG. 7B is a diagram for explaining the passage of the slits 17 of the disk 16 through the groove of the photointerrupter 14 when the disk 16 is rotated.

FIG. 7B is a diagram for explaining the passage of the slits 17 of the disk 16 through the groove of the photointerrupter 14 due to rotation of the disk 16.

The slits 17 have a shape that when the disk 16 is rotated and each slit 17 reaches a position P1, the right-hand edge of each slit 17 is superposed on the left-hand edge of the slit 18 of the light receiving section. Also, the slits 17 have a shape that when the disk 16 is further rotated and each slit 17 reaches a position P2, the left-hand edge of each slit 17 is superposed on the right-hand edge of the slit 18 of the light receiving section.

When the slits 17 have such a shape, the slits 17 of the disk 16 will not enter the slit 18 of the light receiving section of the photointerrupter 14 obliquely. Thereby, the light from the light emitting section will not be gradually incident on the slit 18 of the light receiving section in accordance with rotation of the disk 16. Also, it is possible to reduce fluctuations in duty of the output of the photointerrupter 14.

Figure 8:
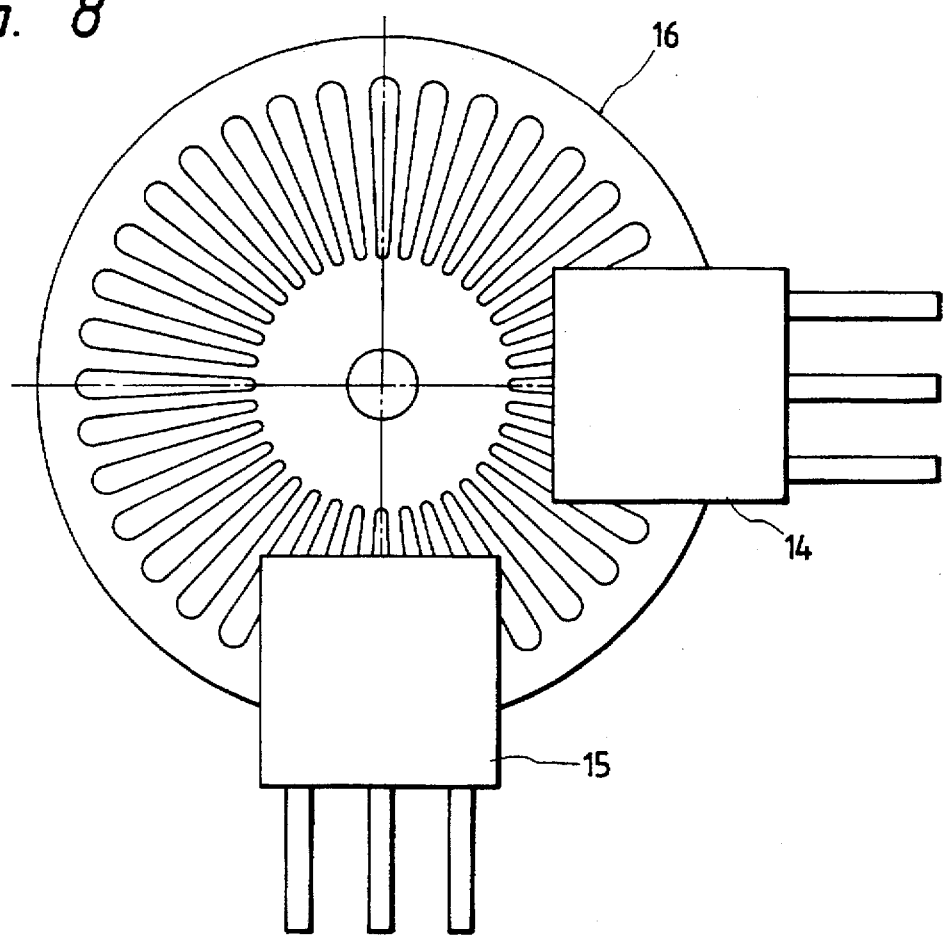
FIG. 8 is a diagram showing the arrangement of the photointerrupters and the disk.

FIG. 8 is a diagram showing the arrangement of the disk 16 and the photointerrupters 14, 15.

The photointerrupters 14, 15 are disposed such that the phase difference between the outputs thereof is 90°.

Figure 9:
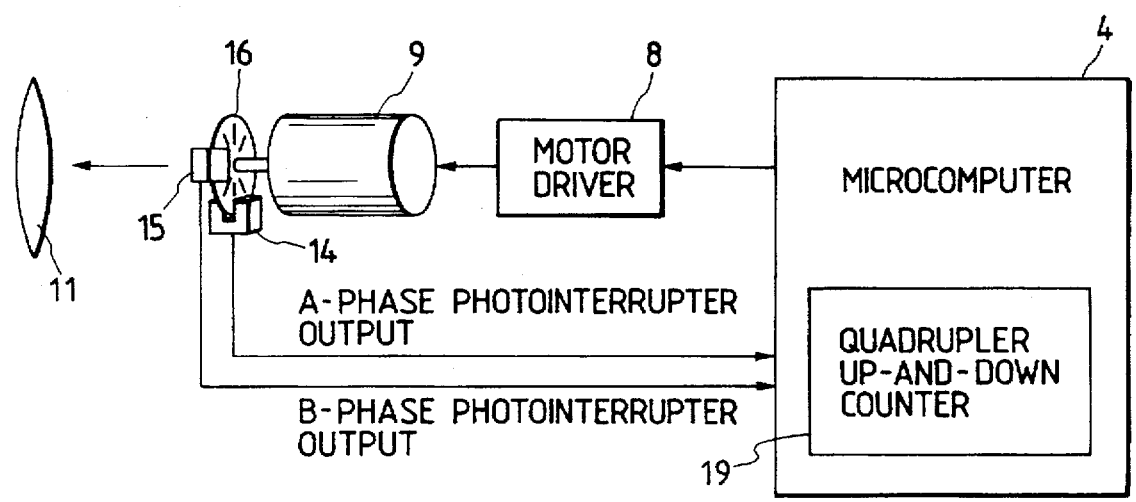
FIG. 9 is a block diagram for explaining the driving system of a preferred embodiment according to the present invention.

FIG. 9 is a block diagram for explaining the driving system of the correcting lens 11.

The microcomputer 4 in the lens barrel 2 drives the motor 9 for the correcting lens via the motor driver 8. The correcting lens 11 is driven by the motor 9 to correct a camera shake. Also, the disk 16 is rotated in accordance with the drive of the motor 9, whereby on and off states of photointerrupters 14, 15 are repeated. The output signals from the photointerrupters 14, 15 are input to a quadrupler up-and-down counter.

Figure 10:
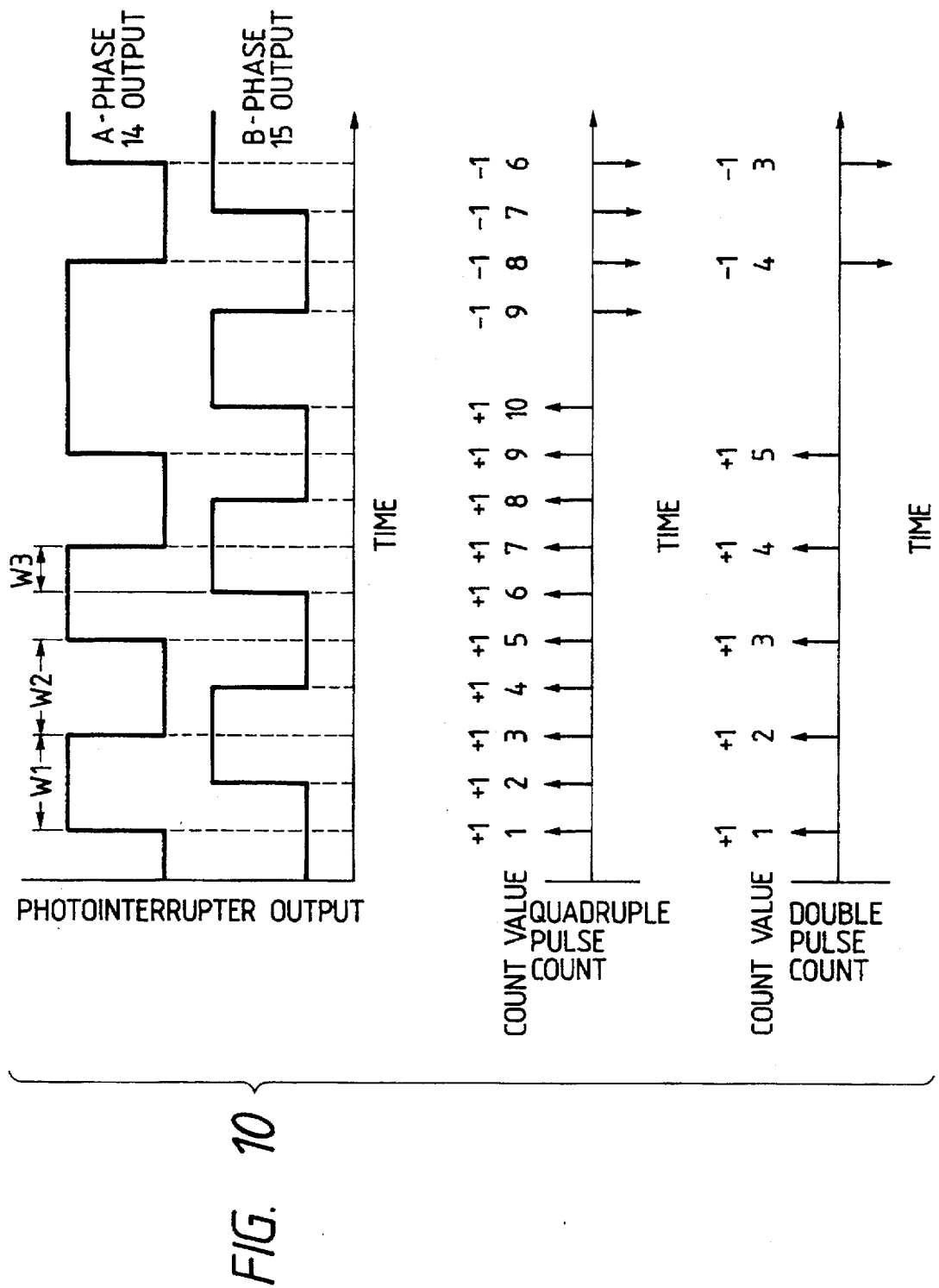
FIG. 10 is a timing chart showing the outputs of the photointerrupters and for explaining the quadruple counting according the present invention.

FIG. 10 is a timing chart for explaining the quadrupler up-and-down counter in FIG. 9 and a double up-and-down counter.

FIG. 10 shows the outputs of the photointerrupters 14, 15 when the correcting lens is reversed halfway. The output of the photointerrupter 14 is an A-phase and the output of the photointerrupter 15 is a B-phase.

The quadruple counting is carried out by counting all the rising and falling edges of the A- and B-phases. Upcount and downcount are carried out in the following manner.

When the value of the A-phase detected at the rising edge of the B-phase in high, upcount.

When the value of the A-phase detected at the rising edge of the B-phase is low, downcount.

When the value of the A-phase detected at the falling edge of the B-phase is high, downcount.

When the value of the A-phase detected at the falling edge of the B-phase is low, upcount.

When the value of the B-phase detected at the rising edge of the A-phase is high, downcount.

When the value of the B-phase detected at the rising edge of the A-phase is low, upcount.

When the value of the B-phase detected at the falling edge of the A-phase is high, upcount.

When the value of the B-phase detected at the falling edge of the A-phase is low, downcount.

As shown in FIG. 10, the quadrupler counter performs the upcount until the correcting lens is reversed, and it performs the downcount thereafter.

Therefore, the resolution becomes the ¼ cycle of a photointerrupter output pulse. In order to make the resolution the ¼ cycle of a pulse, the ratio of W1 to W2 of FIG. 10 needs to be 1:1, i.e., the duty of the pulse needs to be 50%, and the phase difference W3 between the A- and B-phases needs to be 90°. In this case, the counting of the quadrupler up-and-down counter is carried out every ¼ cycle.

The double counting is carried out by counting all the rising and falling edges of the A-phase. The upcount and downcount are carried in the following manner.

When the value of the B-phase detected at the rising edge of the A-phase is high, downcount.

When the value of the B-phase detected at the rising edge of the A-phase is low, upcount.

When the value of the B-phase detected at the falling edge of the A-phase is high, upcount.

When the value of the B-phase detected at the falling edge of the A-phase is low, downcount.

As shown in FIG. 10, the doubler counter performs the upcount until the correcting lens is reversed, and it performs the downcount thereafter.

Therefore, the resolution becomes the ½ cycle of a photointerrupter output pulse. In order to make the resolution the ½ cycle of a pulse, the ratio of W1 to W2 needs to be 1:1, i.e., the duty of the pulse needs to be 50%. In this case, the counting of the doubler up-and-down counter is carried out every ½ cycle.

The resolution in the detection of the doubler up-and-down counter is half of that of the quadrupler up-and-down counter. However, few counting errors occur even though the duty ratio of the pulse and the phase difference between the A- and B-phased are fluctuated largely.

Figure 11A:
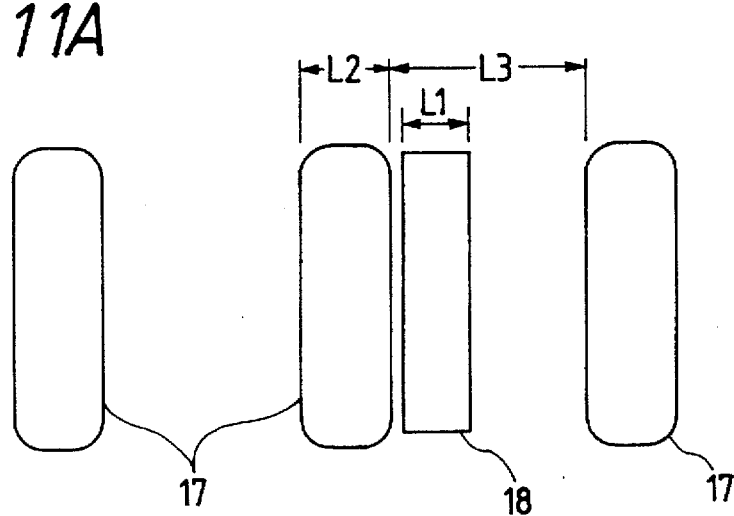
FIG. 11A is a diagram for explaining the width of the slits of the light receiving sections of the photointerrupters, the width of the slits of the disk and the width of the light-shielding portions of the disk according to the present invention.
Figure 11B:
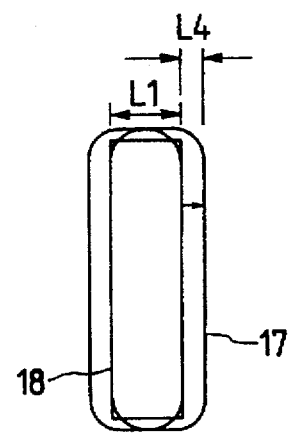
FIG. 11B shows the state where light from the LED of the light emitting section of the photointerrupter is incident on the whole surface of the slit of the light receiving section according to the present invention.
Figure 11C:
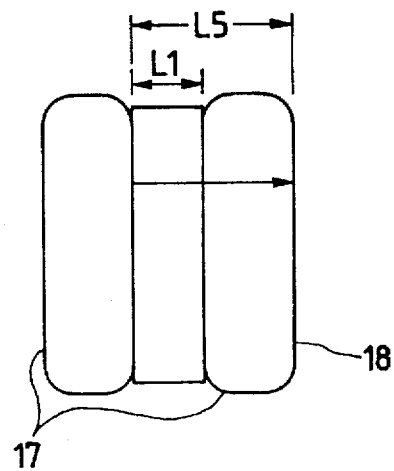
FIG. 11C shows the state where light from the LED is incident on a portion of the slit of the light receiving section according to the present invention.

FIGS. 11A to 11C are diagrams for explaining the on and off timing of the slits 17 of the disk 16 and the slits 18 of the light receiving sections of the photointerrupters 14, 15.

In FIG. 11A, L1 is the width of the slits 18 of the light receiving sections of the photointerrupters 14, 15. L2 is the width of the slits 17 of the disk 16. L3 is the width of light shielding portions between the slits 17 of the disk 16.

When a slit 17 moves from the left to the right with respect to the slit 18 of the light receiving section of the photointerrupter, and when current supplied to the LED of the light emitting section of the photointerrupter is small, the photointerrupter will not be turned on if light from the LED is not incident on the whole surface of the slit 18 of the light receiving section as shown in FIG. 11B. In that case, the photointerrupter is turned on from when the right-hand edge of the slit 17 of the disk 16 reaches the right-hand edge of the slit 18 to when the left-hand edge of the slit 17 of the disk 16 reaches the left-hand edge of the slit 18 of the light receiving section. That is, the photointerrupter is turned on in a section with a width L4.

When current supplied to the LED of the light emitting section of the photointerrupters 14, 15 is great, the photointerrupters 14, 15 are turned on even though light from the LED is incident on a portion of the slit 18 of the light receiving section as shown in FIG. 11C. In this case, the photointerrupters 14, 15 are turned on from when the right edge of the slit 17 of the disk 16 reaches the left-hand edge of the slit 18 of the light receiving section to when the left-hand edge of the slit 17 of the disk 16 reaches the right-hand edge of the slit 18 of the light receiving section. That is, the photointerrupters 14, 15 are turned on in a section with a width L5.

Thus, when the width L2 of the slits 17 of the disk 16 is comparatively close to the width L1 of the slit 18 of the light receiving section, the duty of the output pulses of the photointerrupters 14, 15 is varied in accordance with the amount of current supplied to the LEDs of the light emitting sections of the photointerrupters 14, 15.

The resolution in the detection of the photointerrupters 14, 15 is enhanced as the number of slits 17 provided in the disk 16 is increased. However, in that case, the width of the slits 17 is narrowed, so that the duty of the output pulses of the photointerrupters 14, 15 becomes dependent on the amount of current supplied to the LEDs of the light emitting sections of the photointerrupters 14, 15.

Therefore, if current supplied to the LEDs of the light emitting sections is increased to a certain extent such that the photointerrupters 14, 15 are turned on as in FIG. 11C, the width L2 of the slits 17 of the disk 16 and the width L3 of the light-shielding portions are set so as to make the duty of the output pulses of the photointerrupters 14, 15 be 50% from the following equation:

$$(L1+L2)/(L2+L3) \times 100 = 50\%.$$

The width L1 of the slit 18 of the light receiving section is a constant value determined by the photointerrupter. L2+L3 is the pitch of the slits 17 and is a value determined by the outer diameter of the disk 16 and the number of slits 17. When L1 and L2+L3 are determined, the width L2 of the slits 17 of the disk 16 is determined from the above equation.

Figure 12:
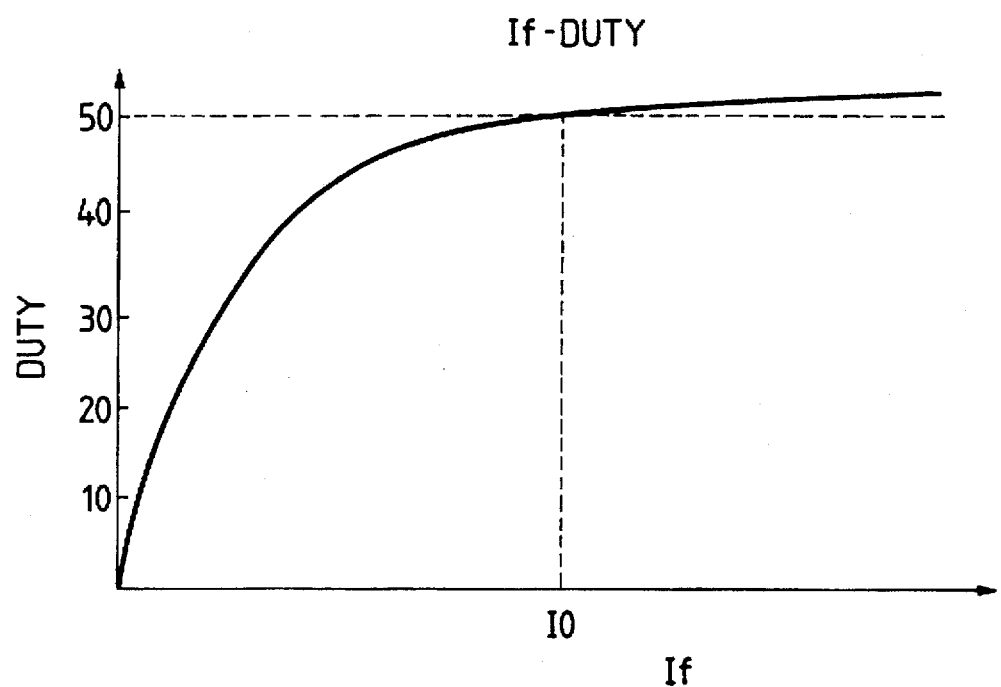
FIG. 12 is a graph showing the relationship between If of the photointerrupters and the duty according to the present invention.

FIG. 12 is a graph showing the relationship between the amount of current supplied to the LEDs of the light emitting sections and the duty of the output pulses of the photointerrupters 14, 15 when the width of the slits 17 of the disk 16 is set from the above equation.

When current supplied to the LEDs of the light receiving sections is small, the duty of the output pulses of the photointerrupters 14, 15 is changed rapidly. When the increased current I0 is supplied to the LEDs, the duty of the output pulses of the photointerrupters 14, 15 becomes the duty set from the above equation as shown in FIG. 11C. Thereafter, even though more than the current I0 is supplied to the LEDS, the duty of the output pulses of the photointerrupters 14, 15 becomes approximately the set duty.

Therefore, when the width of the slits 17 of the disk 16 is set in accordance with the above equation and current capable of securing the set duty is supplied to the LEDs of the light receiving sections, the duty of the output pulses becomes 50% and it is possible to obtain high resolution.

However, when the current is set as above, the current supplied to the LEDs of the light receiving sections is increased, so that the battery is spent quickly and the problem of supply capacity arises.

Figure 13:
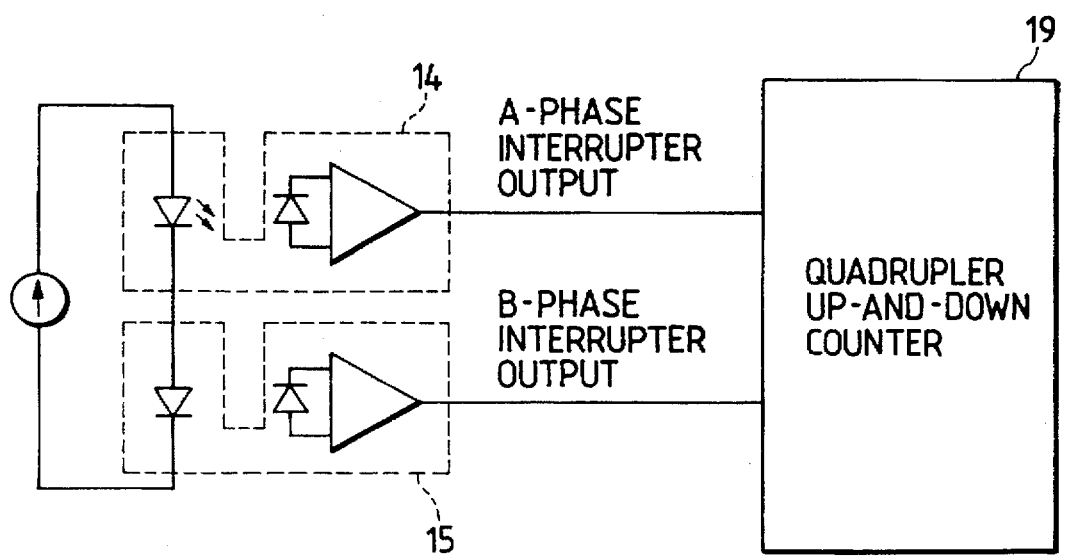
FIG. 13 is a diagram showing the connection of the photointerrupters according to the present invention.

FIG. 13 is a diagram showing the LEDs of the light emitting sections of the photointerrupters 14, 15 connected in series.

Constant current is supplied to an anode of the LED of the light receiving section of the photointerrupter 14 and a cathode thereof is connected to an anode of the photointerrupter 15. Therefore, the supplied current is half of current supplied to each of the photointerrupters 14, 15 separately.

As described above, according to the present invention, even though the number of slits of the disk is increased, the duty of the output pulses of the photointerrupters becomes 50%. Also, the output pulses are counted by the quadrupler counter. Therefore, the resolution of the positional detection of the correcting lens can be enhanced, and correcting errors of blurring of an image due to a camera shake can be reduced.

Further, since the LEDs of the light receiving sections of the photointerrupters are connected in series, the amount of current to be spent can be lessened, so a battery can be used much longer.

The present invention will be described more in detail in accordance with another embodiment with reference to the accompanying drawings.

Figure 14:
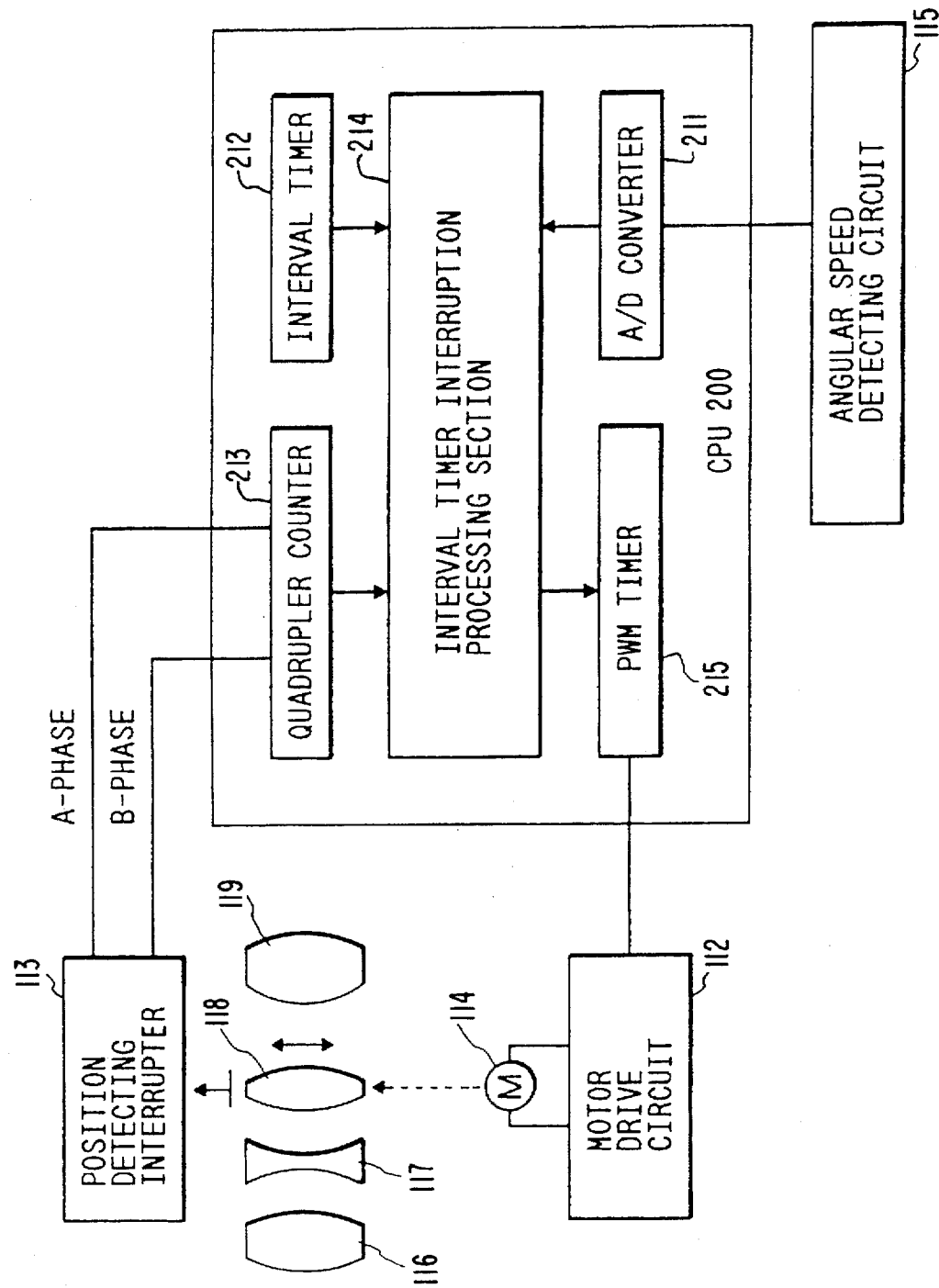
FIG. 14 is a circuit diagram schematically showing a camera with an anti-vibration function according to a preferred embodiment of the present invention.
Figure 15:
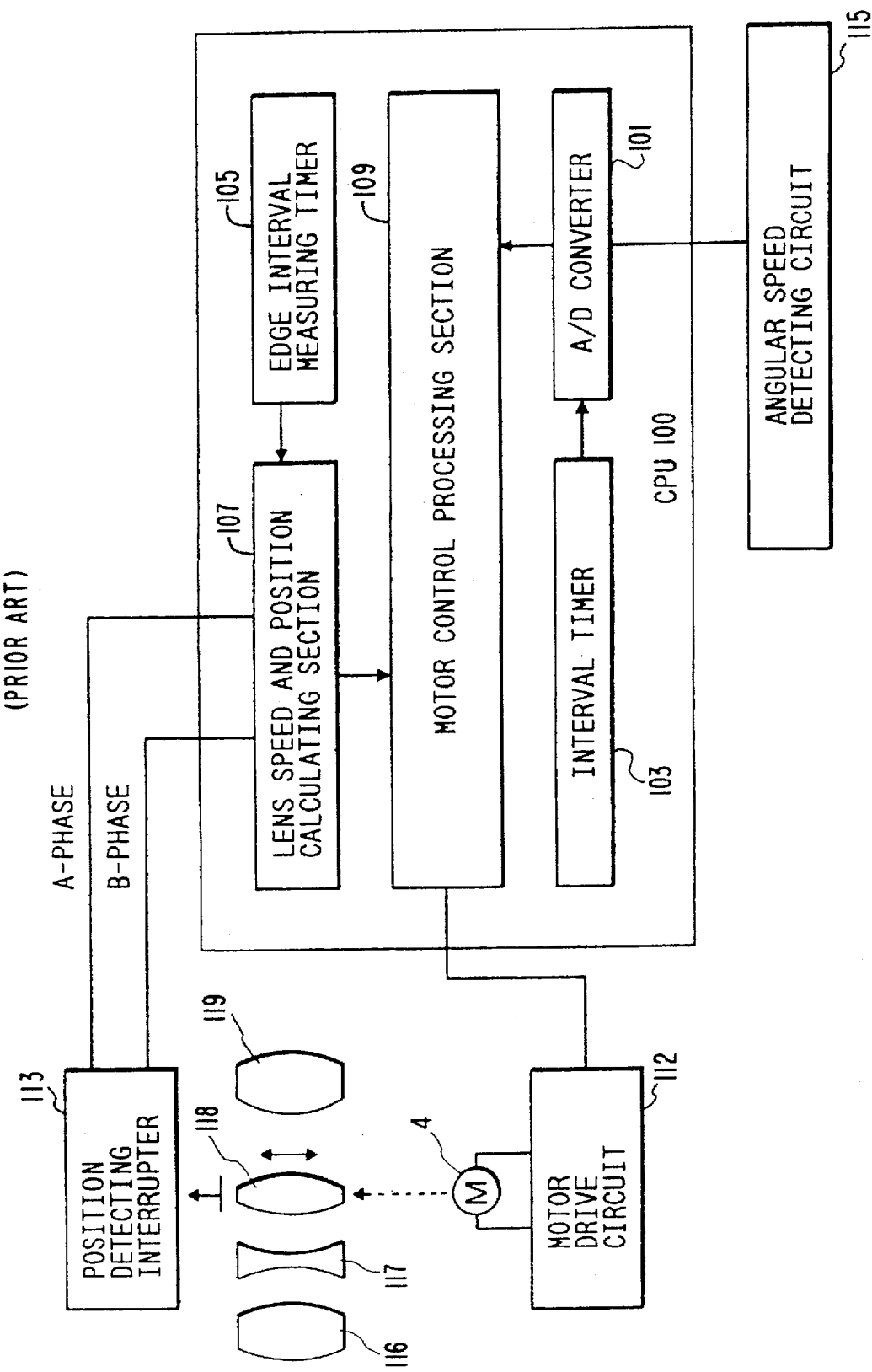
FIG. 15 is a circuit diagram showing a conventional camera with an anti-vibration function.

FIG. 14 is a circuit diagram schematically showing a camera with an anti-vibration function according to an embodiment of the present invention. Elements the same as those in the conventional circuit diagram (FIG. 15) are designated by the identical reference numerals and the overlapped description will be omitted. Chiefly, this embodiment differs from the prior art in internal function of a CPU 200 and program processing.

The CPU 200 has an A/D converter 1-11, an interval timer 212, a quadrupler counter 213, an interval timer interruption processing section 214 to be repeatedly driven by the interval timer 212 at predetermined time intervals, e.g., 1 ms intervals, and a PWM timer 215.

The PWM timer 215 can change the ratio of the high to low level of its output during a predetermined period of time. This PWM timer 215 controls the drive time of the motor 114 during the predetermined period of time by setting arbitrary drive duty, thereby performing more minute speed control of the correcting lens 118. Such control is called PWM (Pulse Width Modulation) control.

First, a method of detecting the position, speed and shifting direction of the correcting lens 118 will be described.

The difference between this embodiment and the prior art is that A- and B-phase signals of the position detecting interrupter 113 is input to the quadrupler counter 213 contained in the CPU 200

Next, the function of the quadrupler counter will be described with reference to FIG. 16. FIG. 16 shows the operation of the quadrupler counter of this embodiment and a method of calculating the position and speed of the correcting lens. The quadrupler counter 213 adds +1 or −1 to its count at each rising and each falling of the input two phase signals.

For example, the counting is carried out as follows.
At the time of risings of the A-phase;
  When the B-phase is high, the count is increased by +1.
  When the B-phase is low, the count is decreased by by +1.
At the time of fallings of the A-phase;
  When the B-phase is low, the count is increased by +1.
  When the B-phase is high, the count is decreased by −1.
At the time of risings of the B-phase;
  When the A-phase is low, the count is increased by +1.
  When the A-phase is high, the count is decreased by −1.
At the time of the fallings of the B-phase;
  When the A-phase is high, the count is increased by +1.
  When the A-phase is low, the count is decreased by −1.

Thereby, when the A- and B-phases of the interrupter signals are input to the quadrupler counter 213, its count becomes the value corresponding to the correcting lens position LR. Also, the counting operation is carried out at all the risings and fallings of the A- and B-phases. Therefore, in this embodiment, the resolution is enhanced by four times, as compared with the prior art.

Also, it is possible to detect the position of the correcting lens 118 only by reading the count of the quadrupler counter 213 without counting up or down by means of the soft process as in the prior art.

Next, a method of calculating the speed of the correcting lens 118 will be described. The speed of the correcting lens 118 can be calculated by obtaining the change in count of the quadrupler counter 213 for a predetermined period of time, e.g., 1 ms. Here, a method of obtaining the change in count for 1 ms will be described with reference to FIG. 16.

As the change in count from the time t1 to the time t2 is +8, the correcting lens speed VR is +8/ms. Similarly, as the change in count from the time t2 to the time t3 is −2, the correcting lens speed VR is −2/ms.

As above, the calculation of the position and speed of the correcting lens is simplified remarkably, as compared with the calculation method by the use of the equation (2) in the prior art. Also, there is no need to detect the sign of the correcting lens speed from the other phase. Thus, the program processing necessary for calculating the speed VR and the position LR of the correcting lens 118 is reduced greatly.

Figure 20:
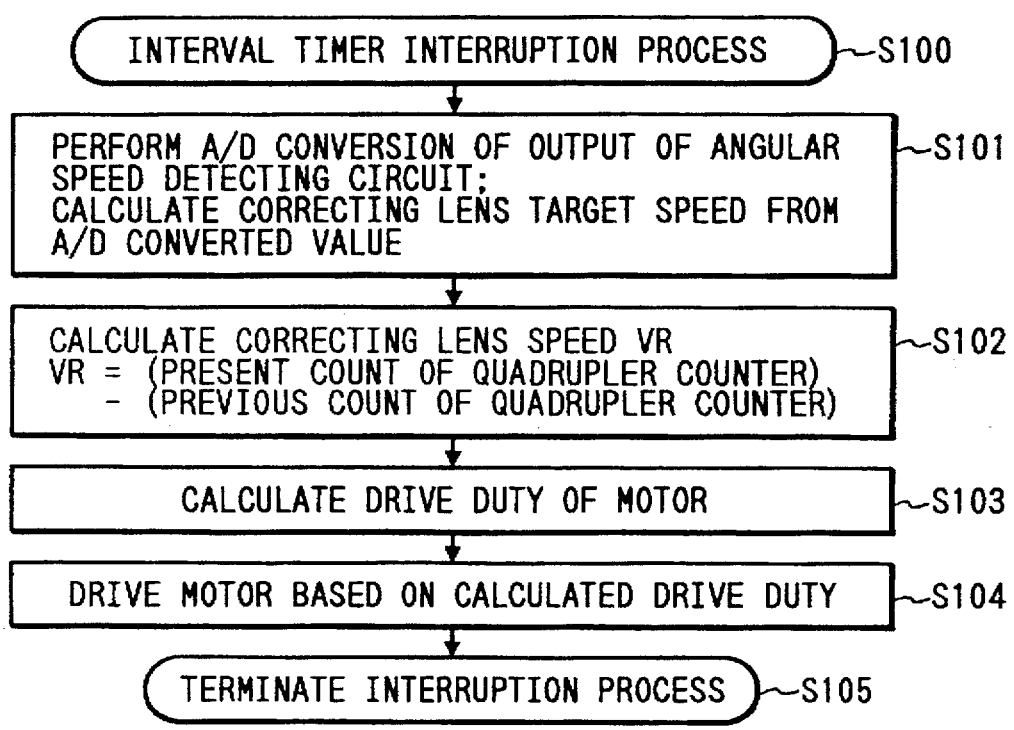
FIG. 20 is a flowchart showing the procedure of an interval timer interruption process in a camera according to the present invention.

Next, the process of controlling the motor 114 in this embodiment will be described with reference to FIG. 20. FIG. 20 is a flowchart showing the procedure of an interval timer interruption process in this embodiment. FIG. 20 shows a portion concerning this embodiment extracted from the program process contained in the CPU 200.

In the step S100, an interval timer interruption process which is driven by the interval timer 212 in the CPU 200 of FIG. 14 repeatedly at predetermined time intervals (1 ms intervals) is started.

First, in the step S101, the A/D conversion of the output from the angular speed detecting circuit 115 is performed and the correcting lens target speed VC is calculated from the A/D converted value in accordance with the equation (1).

Next, in the step S102, the correcting lens speed VR is calculated by subtracting the previous count of the quadrupler counter 213 from the present count thereof, and thereafter, the procedure goes to the step S103.

Thus, the interval timer interruption process is performed repeatedly at predetermined time intervals. Therefore, by obtaining the difference between the count of the quadrupler counter 213 in the previous interval timer interruption process and the count of the quadrupler counter 213 in the current interval timer interruption process, the change during the predetermined period of time (1 ms), i.e., the speed VR of the correcting lens can be obtained.

The count of the quadrupler counter 213 in the interval timer interruption process is maintained till the step S102 of the following interval timer interruption process.

Next, in the step S103, the drive duty of the motor 114 is calculated from VC and VR calculated in the steps S101 and S102 in accordance with the following equation (4). The upper limit of the drive duty is +100%, and the lower limit thereof is −100%.

$$\text{The drive duty} = K1 \times VC + K2 \times (VC - VR). \tag{4}$$

Then, in the step S104, the calculated drive duty is set in the PWM timer 215, and the motor 114 is driven based on the set drive duty via the motor drive circuit 112. Next, the interval timer interruption process is completed in the step S105.

In the equation (4), the first term $K1 \times VC$ is the duty proportional to the correcting lens target speed VC, by which the correcting lens 118 is controlled to shift at a speed close to the target speed VC. Further, the second term $K2 \times (VC - VR)$ is the difference between the target speed VC and the actual speed VR, i.e., the duty proportional to the speed error, by which the correcting lens 118 is controlled to shift precisely at the target speed VC.

K1 and K2 are set to optimum values by carrying out tests such that the actual speed VR of the correcting lens 118 is controlled accurately with respect to the target speed VC. The equation (4) is an example of a control equation and control equations other than this may be utilized.

Figure 18:
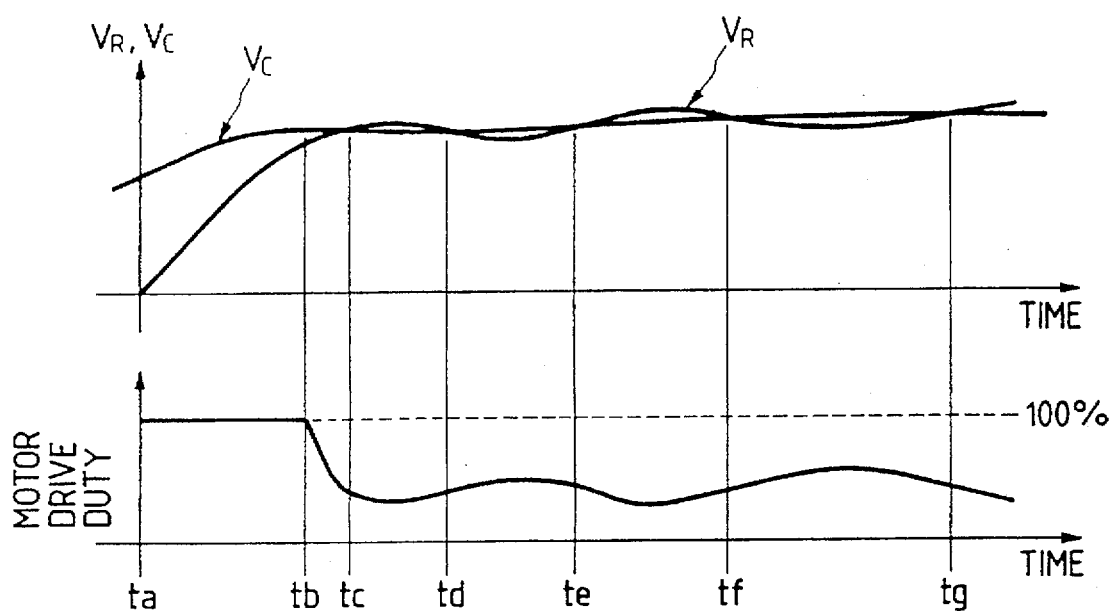
FIG. 18 is a timing chart showing a method of controlling the motor in the camera according to a present invention.

Next, the state where the correcting lens 118 is controlled will be described with reference to FIG. 18. FIG. 18 is a graph showing a method of controlling the motor in this embodiment.

Figure 19:
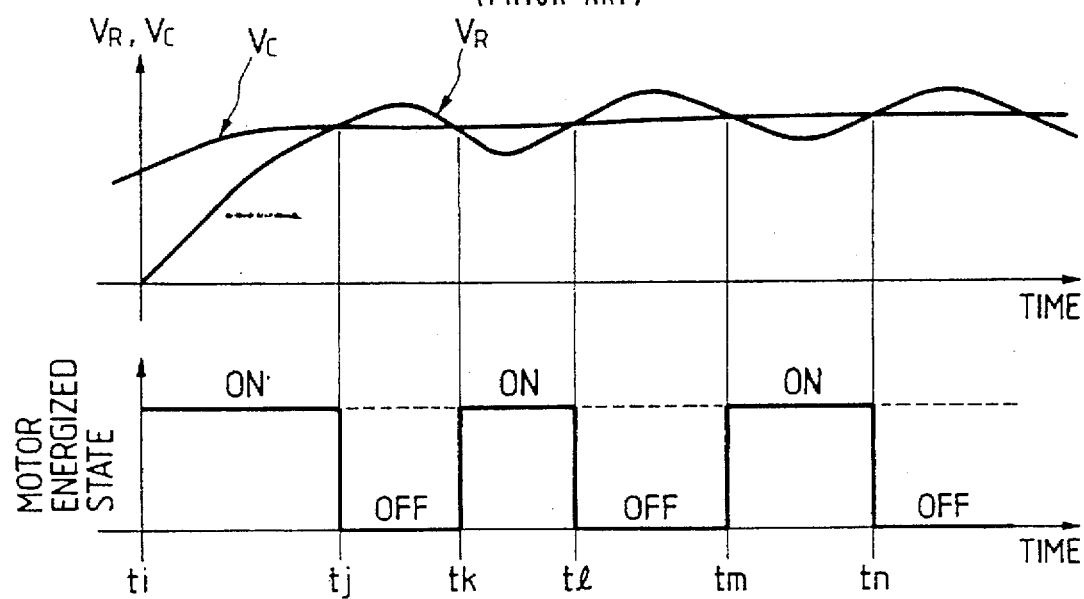
FIG. 19 is a timing chart showing a method of controlling the motor in the conventional correcting camera of the prior-art example.

During the time ta to tb, the difference between VC and VR is large, so that the drive duty calculated by the equation (4) is the upper limit value of +100%. After the time tb, the difference between VC and VR is small, so that the drive duty determined by the equation (4) is less than 100% and the motor 114 is controlled based on minute drive duty. Thereby, as compared with the conventional control method of FIG. 19, the control of the correcting lens 118 is performed smoothly and control errors (corresponding to the difference between VC and VR) are reduced.

According to this embodiment, by containing the quadrupler counter 213, the PWM timer 215, the interval timer 212, and the like in the CPU 200, the load of the process of the CPU 200 can be reduced, and the correcting lens can be controlled smoothly.

The present invention is not limited to the above embodiment and various modifications and changes can be taken within the scope and spirit of the present invention.

For example, in the above embodiment, the control of the correcting lens 118 is performed by the PWM control wherein the drive duty for the motor 114 is varied, but may be performed by the voltage control wherein the drive voltage for the motor 114 is varied.

The voltage control corresponds to the control wherein the drive voltage is substituted for the drive duty, and a voltage corresponding to the drive duty is produced by a microcomputer with a D/A converting function or the like. Then, the motor 114 is driven by the motor drive circuit 112 in accordance with a voltage proportional to the produced voltage.

Also, in this embodiment, the optical axis of the phototaking optical system is changed by shifting a portion of the phototaking optical system, but may be changed by a variable angle prism. Further, instead of the motor 114, actuators such as a voice coil may be utilized.

Also, the doubler counter may be utilized instead of the quadrupler counter. In this case, the count of the doubler counter is increased or decreased based on the phase difference between the A- and B-phases at risings and fallings of the A-phase or the B-phase, which is equivalent to counting alternate count values of FIG. 16.

Further, the time interval for obtaining the change in count is 1 ms in the above embodiment, but not limited thereto and may be 2 ms, etc., in accordance with the design specifications. The same can be said for the other numerical values used in this embodiment.

In the present invention, by referring to the count of the multiplication counter, the position of an optical axis changing section such as the correcting lens can be detected and the load of the process such as the displacement calculation can be reduced.

Also, by setting desirable values in the PWM timer at predetermined time intervals, an optical axis change driving section such as the motor can be driven, and controlled more minutely as compared with the prior art.

Further, by obtaining the difference between the previous count of the multiplication counter and the present count of the multiplication counter based on the interruption process driven by the interval timer, it is possible to calculate the speed of the optical axis changing section such as the correcting lens, and there is no need to execute a complex calculation as in the prior art.

What is claimed is:

1. A camera with a vibration correcting lens system driven by a motor to perform anti-vibration, said camera comprising:

a disk, having slits and light-shielding portions, coupled to the motor; and photointerrupters to generate an interrupter signal output during a rotation of said disk, said slits and said light-shielding portions each having a width that makes a duty of the interrupter signal output of said photointerrupters to be approximately fifty percent.

2. A camera as recited in claim 1 wherein said slits are shaped to reduce fluctuations in the duty of the interrupter signal output of said photointerrupters.

3. A camera as recited in claim 1, further comprising:

a displacement calculating device, having a doubler counter, to determine a position and a speed of the vibration correcting lens system based on a count by said doubler counter of risings and/or fallings of the interrupter signal output of said photointerrupters.

4. A camera as recited in claim 1, further comprising:

a displacement calculating device, having a doubler counter, to determine a position and a speed of the vibration correcting lens system based on a count by said doubler counter of risings and/or fallings of the interrupter signal output of said photointerrupters.

5. A camera with a vibration correcting lens system driven by a motor to perform anti-vibration, said camera comprising:

a disk coupled to the motor; and photointerrupters to generate an interrupter signal output during a rotation of said disk, said disk having slit means and light-shielding means to make a duty of the interrupter signal output of said photointerrupters to be approximately fifty percent.

6. A camera as recited in claim 5 wherein said slit means is shaped to reduce fluctuations in the duty of the interrupter signal output of said photointerrupters.

7. A camera as recited in claim 5, further comprising:

a displacement calculating device, having a quadrupler counter, to determine a position and a speed of the vibration correcting lens system based on a count by said quadrupler counter of risings and/or fallings of the interrupter signal output of said photointerrupters.

8. A camera as recited in claim 5, further comprising:

a displacement calculating device, having a doubler counter, to determine a position and a speed of the vibration correcting lens system based on a count by said doubler counter of risings and/or fallings of the interrupter signal output of said photointerrupters.

9. A camera with a vibration correcting lens system driven by a motor to perform anti-vibration, said camera comprising:

a disk, having slits and light-shielding portions, coupled to the motor;

photointerrupters to generate an interrupter signal output during a rotation of said disk, said slits and said light-shielding portions each having a width that makes a duty of the interrupter signal output of said photointerrupters to be approximately fifty percent; and a displacement calculating device, having at least one of a quadrupler counter and a doubler counter, to determine a position and a speed of the vibration correcting lens system based on a count, by said at least one of said quadrupler counter and said doubler counter, of at least one of risings and fallings of the interrupter signal output of said photointerrupters.

10. A camera as recited in claim 9, further comprising:

an interval timer to initiate an interruption at predetermined time intervals, wherein said displacement calculating device determines the speed of the vibration correcting lens system by calculating a difference between a previous count and a present count at the interruption at each of the predetermined time intervals.

11. A camera as recited in claim 9, further comprising:

a PWM timer to control a driving of the motor based on a drive duty or a drive voltage of the motor that causes the motor to drive the vibration correcting lens system at a target speed.

12. A method to preform anti-vibration in a camera with a vibration correcting lens system driven by a motor, said method comprising the steps of:

rotating a disk, having slits and light-shielding portions, coupled to the motor;

generating an interrupter signal output from photointerrupters during said rotating step;

making a duty of the interrupter signal output from said step of generating to be approximately fifty percent based on a width of said slits and said light-shielding portions;

counting by at least one of a quadrupler counter and a doubler counter at least one of risings and fallings of the interrupter signal output from said generating step; and determining a position and a speed of the vibration correcting lens system based on said counting step.

13. A method as recited in claim 12, further comprising the step of:

reducing fluctuations in the duty of the interrupter signal output from said step of generating based on a shape of the slits.

14. A method as recited in claim 12, further comprising the step of:

initiating an interruption at predetermined time intervals, wherein said step of determining determines the speed of the vibration correcting lens system by calculating a difference between a previous count and a present count at the interruption at each of the predetermined time intervals.

15. A method as recited in claim 12, further comprising the step of:

controlling a driving of the motor based on a drive duty or a drive voltage of the motor that causes the motor to drive the vibration correcting lens system at a target speed.

* * * * *